United States Patent
Chen et al.

(10) Patent No.: US 8,825,467 B1
(45) Date of Patent: Sep. 2, 2014

(54) TRANSLATION GAME

(75) Inventors: Johnny Chen, Mountain View, CA (US); Cathy Gordon, Mountain View, CA (US)

(73) Assignee: Google Inc., Mountain View, CA (US)

( * ) Notice: Subject to any disclaimer, the term of this patent is extended or adjusted under 35 U.S.C. 154(b) by 551 days.

(21) Appl. No.: 13/170,308

(22) Filed: Jun. 28, 2011

(51) Int. Cl.
*G06F 17/28* (2006.01)
*G10L 13/027* (2013.01)

(52) U.S. Cl.
USPC .................................................. 704/2; 704/4

(58) Field of Classification Search
USPC ............................................................ 704/2
See application file for complete search history.

(56) References Cited

U.S. PATENT DOCUMENTS

2003/0009320 A1* 1/2003 Furuta ................................ 704/2
2008/0221864 A1* 9/2008 Blumenthal ....................... 704/4

OTHER PUBLICATIONS

GWAP ESP image tagging game. Information available at: http://www.gwap.com/gwap/about/. Web page visited on Aug. 15, 2012.

* cited by examiner

*Primary Examiner* — Daniel D Abebe
(74) *Attorney, Agent, or Firm* — Remarck Law Group PLC

(57) ABSTRACT

High quality, human-generated training data for a parser can be accumulated through an online game in which two or more bi- or multi-lingual players compete to accurately translate phrases. When two or more translated phrases are sufficiently similar to each other, they can be treated as an accurate translation and one or more can be added to training data for a parser.

20 Claims, 3 Drawing Sheets

TRANSLATION GAME

BACKGROUND

Automatic machine translators that translate phrases from one language to another often include parsers. A parser can be a component of a machine translator that analyzes syntax and builds a data structure (e.g., often some kind of parse tree, abstract syntax tree or other hierarchical structure) implicit in the input tokens, such as elements of a source language to be translated into a target language. Many modern parsers are at least partly statistical and rely on a corpus of training data that has already been annotated (parsed by hand), such as a Treebank. Other training data can be un-annotated target phrases that are known to be good translations of a given source phrase. When the parser processes training data, it allows the parser to gather information about the frequency with which various constructions occur in specific contexts and to build an inductive statistical model that allows the parser to create (e.g., induce, propose, hypothesize, etc.) grammatical structures (parses) from previously unseen sentences.

The parser's statistical parameters can be improved by comparing its own, machine-generated candidate parse of a source phrase to a reference target in another language that is a known, good translation of the same phrase. The differences between a machine-generated candidate parse and a reference can be used to adjust the statistical parameters of the parser to generate better outputs for subsequent source phrases.

The quality of the parses generated by a statistical parser can depend upon the extent to which it has been trained with good training data. Hand-annotated training data can be expensive to produce. However, un-annotated training data that includes known good translations of source phrases can be less expensive and still be effective in improving parser parameters. Such known good reference translations are often human-generated.

BRIEF SUMMARY

According to an embodiment of the disclosed subject matter, a phrase is rendered to a first player and a translation of the phrase from the first player is received. The translation of the phrase received from the first player is compared with a translation of the phrase received from the second player. The translation received from the first player can be compared to the translation received from a second player. The translation received from the first player may be determined to be similar to the translation received from the second player. The parser may be modified based on the translation received from the first player.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

A machine translator can be trained using translations of source phrases into reference target phrases made by bilingual humans. Embodiments of the disclosed subject matter can include a game that incentivizes bi- or multi-lingual human players to provide high quality translations of source phrases proposed by the game. The translations can be added to training data for parsers. The nature of the source phrases can be manipulated to generate reference phrases in areas in which a parser is known to be weak, such as with regard to a particular dialect, jargon, an idiomatic aspect of a language, etc.

Figure 1:
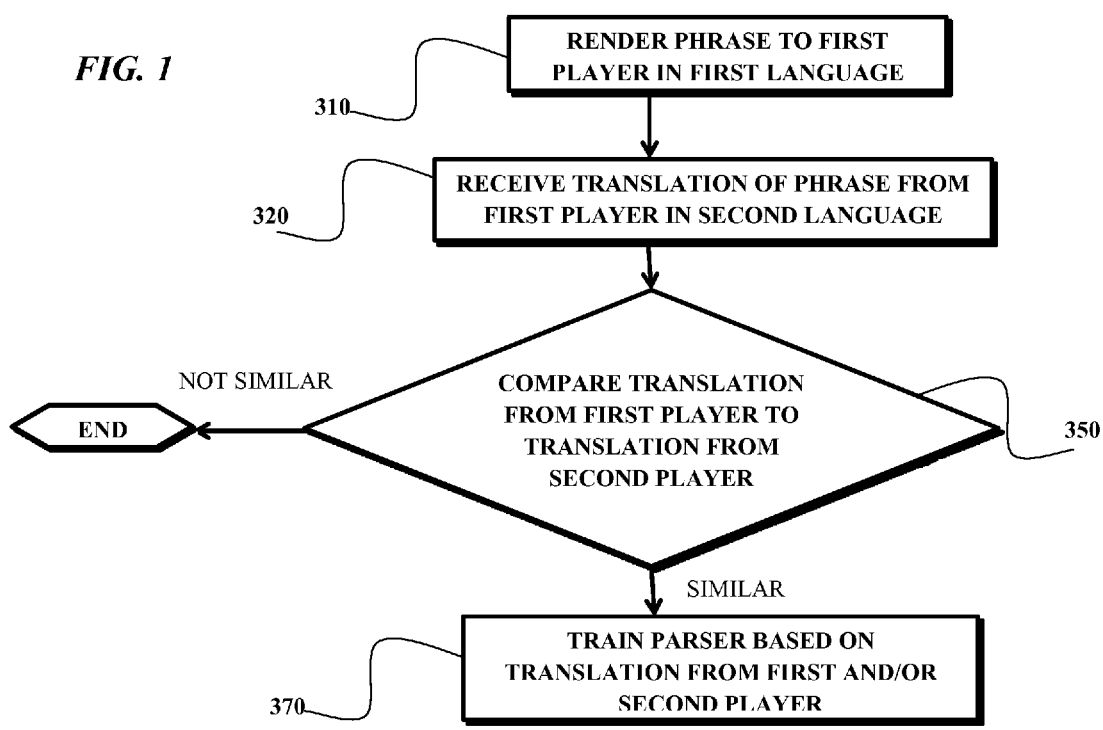
FIG. 1 shows a diagram explaining the games for natural translation to improve translation database according to an embodiment of the disclosed subject matter.

According to embodiments of the disclosed subject matter, the implementation can include a game that is likely to be played by multiple players. As shown in FIG. 1, one or more players may be shown a phrase in a first language 310. The players may provide a translation of the phrase in a second language 320. The players may input the translations by entering text, by verbally speaking the translation, selecting from a plurality of choices presented by the game or in any other way suitable for inputting data. More than one player may be given the same phrase in one language and may be asked to translate the phrase to a second language. As the players enter their translations, the implementation may compare the translations 350 by looking for matches or similarities between the answers from the more than one player, each of whom may be entering their responses independently from one another. A match or similarity between answers that exceeds a certain similarity threshold may be taken to indicate a good translation. This is at least partly because the multiple players may converge on the same correct translation, while incorrect translations may be more different from each other.

The similarity of the player-input translations may be determined based on a scoring metric such as a human ranking of the translations, an edit distance, a ROUGE score (e.g., a technique that compares an output against a reference or a set of references or translations), a BLEU score (e.g., a technique that compares an output with a set of reference outputs), a METEOR score, or any other applicable criteria or a combination thereof.

The machine translator parser may parse a phrase in a first language and determine a translation for the phrase in a second language. To train the translator to obtain better quality translations, the translator may use player-input translations, especially matching or similar translations, to train its parser data. The player-input translations may be compared to the parsed translation. If the similarity of the player-input translation and the machine translation is below a second similarity threshold, it may indicate that the parser data is essentially correct. In that case, no change may be made to the parser data (the statistical parameters used by the parser to parse a source phrase), or the existing parser data may be weighted more heavily. If the similarity between the player-input translation and the machine translation is above the second similarity threshold, it may indicate that the machine translation is substantially different from the translation provided by the human players and is incorrect. In that case, the parser data may be modified to make it more likely that subsequent phrases with similar structures are translated in a fashion that more closely resembles the human player-provided translations. In particular, the parser data may be modified to increase the likelihood that the machine translator outputs the player-input translation, to decrease the likelihood that the parser outputs the parsed translation, or both.

To provide an incentive to the players to play the game, the game may allow players to earn game points when a player's translation is the same as or similar to a translation provided by one or more other players. The sameness or similarity (or lack thereof) may be determined using a similarity threshold.

In an illustrative example, the translator may translate the English phrase "good morning" into Spanish. The machine translator may output the Spanish phrase "buenos noches" as a translation of the English phrase "good morning" into Spanish. Multiple players playing the game may be given the phrase "good morning" and be asked to translate it into Spanish. In this example, the similarity threshold may be 0 such that (similar_translation, *, edit distance=0), where * is a wildcard that can represent a user-input translation with an edit distance to another user-input translation being 0. Therefore, only translations which are identical may be used to modify the parser data. According to this example, multiple players may input "buenos dias" as their translation. The multiple players who input "buenos dias" may be awarded game points. As shown in table 1, only those players who entered the identical phrase "buenos dias" would be awarded points, and the players who entered other non-similar terms (such as a misspelled translation such as "buenos dais") would not.

TABLE 1

| Player | Player Translation | Points Awarded |
| --- | --- | --- |
| Player 1 | buenos dias | +1 |
| Player 2 | buenos morning | 0 |
| Player 3 | buenos dias | +1 |
| Player 4 | good dias | 0 |

The machine translator may compare its parsed target phrase "buenos noches" to the player-input "buenos dias". As shown in Table 2, the parser may train itself by altering its parser data by increasing the probability that "buenos dias" is the correct translation in Spanish for "good morning" in English. Therefore, in subsequent translations, "buenos dias" may be more likely to be the parsed Spanish translation for "good morning" in English. The parser may also train itself by altering its parser data by decreasing the probability of "buenos noches" being the parsed translation in Spanish for "good morning" in English.

TABLE 2

| Translation of English Phrase "good morning" to Spanish | Probability before training | Probability after training |
| --- | --- | --- |
| "buenos dias" | .6 | .7 |
| "buenos noches" | .7 | .6 |

The quality of the translations by the players can be further quantified by assigning weights to a player based upon the player's performance history in the game. If a player continuously provides reliable translations such that the translations are either the same as other players, similar to a predetermined translation, or determined to be reliable translations via another metric, then the player's inputs may be weighted higher. If the player does not have much performance history in the game, consistently provides less reliable translations such that the translations are dissimilar translations compared to other players, compared to a predetermined translation, or if the translations are determined to be poor translations, then the player's inputs may be weighted lower. These weights can be used to measure the quality of player-provided translations and regulate the way in which they are used to train the parser.

As an illustrative example, Player A continuously provides reliable translations and the game receives a Spanish translation of "buenos dias" from Player A for the English phrase "good morning". As shown in Table 3, the parser may modify the probability of "buenos dias" being the correct translation for "good morning" from a probability of 0.5 to a 0.7. Assume that Player B regularly provides less reliable translations or does not have as much performance history as Player A in the game. The game receives a Spanish translation of "buenos dias" from Player B for the English phrase "good morning". Accordingly, the parser may modify the probability of "buenos dias" being the correct translation for "good morning" from a probability of 0.5 to a 0.52. Therefore, the translation provided by Player A (the more reliable translation) contributes to a more drastic modification to the parser data in comparison to the translation provided by Player B (the less reliable translation).

TABLE 3

| Player-input Game Translation | Probability of English Phrase "good morning" to Spanish Prior to Modification | Probability of English Phrase "good morning" to Spanish Post Modification as a Result of Player-input translation |
| --- | --- | --- |
| Player A (reliable) | 0.5 | 0.7 |
| Player B (less reliable) | 0.5 | 0.52 |

In some embodiments of the disclosed subject matter, the machine translator may select the phrases to be presented to the players according to areas of the language that the translator is weaker in translating. Similarly, the translator may select phrases according to areas of the language with specialized jargon. For example, if the translator does not have sufficient known good translations for medical terms, then the translator may provide players with phrases including medical terms. Accordingly, the translator may strengthen its translations of medical terms due to the player input translations. In this manner, the translator can improve upon the weak areas in its translations.

In some embodiments of the disclosed subject matter, knowledge about the player's attributes (e.g., player profiles, player game history, player online history, etc.) can be used to identify areas in which a player may be able to provide good translations and/or have special strengths, particularly for areas in which the translator is weak. A profile can include any one or more attributes that describe the player or her past, present or predicted behavior or history that can be used directly or indirectly to model the player's strengths, weaknesses, quality of responses, etc. in accordance with embodiments of the presently disclosed subject matter. A player attribute may, but need not, be part of a player profile. For example, suppose that a player history indicates that the player provides reliable translations for medical terms and/or is an expert in the medical field. If the machine translator is known to be weak in translating medical terms, then the player may be provided with an increased amount of medical terms to help train the translator. A machine translator may be determined to be weak in a given area due to a lack of sufficient training data in that area, a record of poor translations in that area, etc.

In some embodiments of the disclosed subject matter, a phrase may be provided to a player in a way that inhibits the phrase from being readable by a machine translation. This can help ensure that a human is providing the translation, thereby improving the chance of obtaining reliable translation for training a parser. In particular, it can help to prevent the parser from being poisoned by inputs generated by other machine translators, which could replicate the same errors and weaknesses in those other translators in the parser sought to be improved in accordance with embodiments of the disclosed subject matter.

In some embodiments of the disclosed subject matter, the translations from a first player and a second player can be received in any order. The translation from the first player may be received either before or after the translation from the second player is received. In this embodiment, the players need not be playing simultaneously and may provide their respective inputs asynchronously. In addition, the players may still be awarded game points at a later time when at least two translations are compared.

In some embodiments of the disclosed subject, players may play the game online. Thus, the players may not be in close proximity to others. The game may provide players from different regions of the world with the same phrase to translate to get more diverse translations. The game may provide players from similar regions of the world with the same phrase obtain translations for specific dialects.

Figure 2:
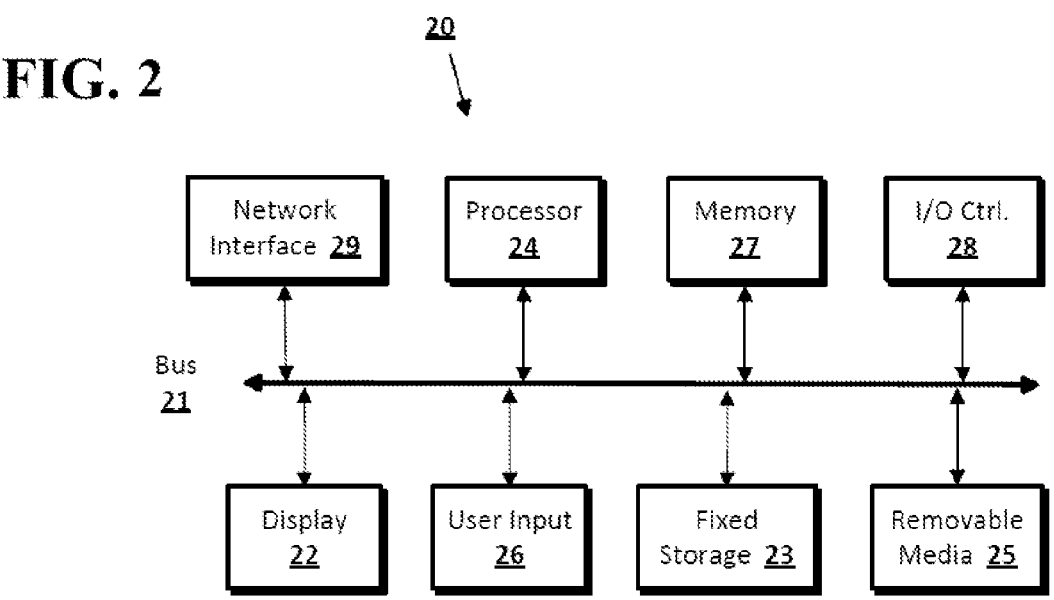
FIG. 2 shows a computer according to an embodiment of the disclosed subject matter.

Embodiments of the presently disclosed subject matter may be implemented in and used with a variety of component and network architectures. FIG. 2 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including a digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 3.

Many other devices or components (not shown) may be connected in a similar manner (e.g., document scanners, digital cameras and so on). Conversely, all of the components shown in FIG. 2 need not be present to practice the present disclosure. The components can be interconnected in different ways from that shown. The operation of a computer such as that shown in FIG. 2 is readily known in the art and is not discussed in detail in this application. Code to implement the present disclosure can be stored in computer-readable storage media such as one or more of the memory 27, fixed storage 23, removable media 25, or on a remote storage location.

Figure 3:
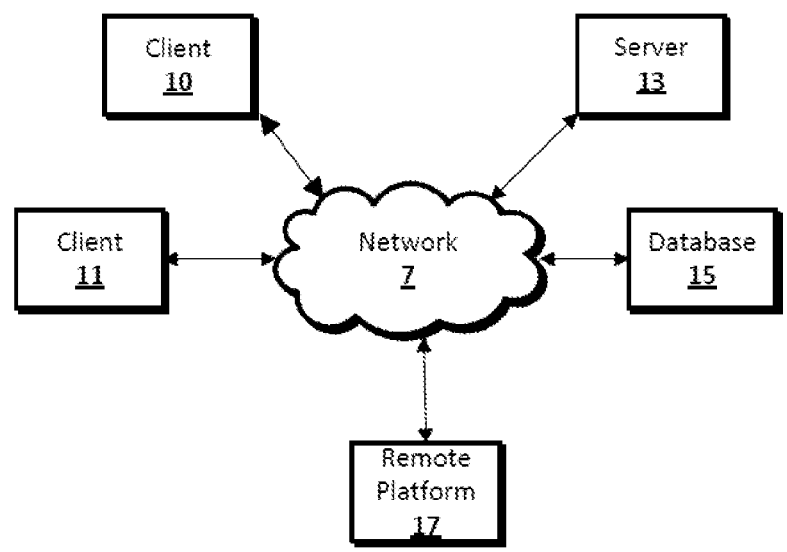
FIG. 3 shows a network configuration according to an embodiment of the disclosed subject matter.

FIG. 3 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description and following appendices, for purpose of explanation, have been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method, comprising:
   determining, at a computing device including one or more processors, an area of language in which the machine translator is weak;
   determining, at the computing device, an attribute of a first player of a translation game, the first player being a human and the attribute of the first player being based on past, present or predicted behavior of the first player;
   generating, at the computing device, a phrase based upon the area of interest to the machine translator and the attribute of the first player;
   rendering, at the computing device, the phrase to the first player;
   receiving, at the computing device, a translation of the phrase from the first player;
   comparing, at the computing device, the translation of the phrase received from the first player to a translation of the phrase received from a second player of the translation game to determine an edit distance between the translation received from the first player and the translation received from the second player, the second player being a human;
   determining, at the computing device, whether there is less than a minimum edit distance between the translation received from the first player and the translation received from the second player; and
   when there is less than the minimum edit distance between the translation received from the first player and the translation received from the second player translation:
      comparing, at the computing device, the translation received from the first player with a machine translation, the machine translation being generated by a machine translator that includes a parser,
      determining, at the computing device, whether the translation received from the first player is similar to the machine translation, and
      when the translation received from the first player is not similar to the machine translation, modifying, at the computing device, parser data upon which the parser is trained based on the translation received from the first player.

2. A method, comprising:
   rendering, at a computing device including one or more processors, a phrase to a first player of a translation game, the first player being a human;
   receiving, at the computing device, a translation of the phrase from the first player;
   comparing, at the computing device, the translation of the phrase received from the first player to a translation of the phrase received from a second player of the translation game, the second player being a human;
   determining, at the computing device, whether the translation received from the first player is similar to the translation received from the second player; and
   when the translation received from the first player is similar to the translation received from the second player:
      comparing, at the computing device, the translation received from the first player with a machine translation, the machine translation being generated by a machine translator that includes a parser,
      determining, at the computing device, whether the translation received from the first player is similar to the machine translation, and
      when the translation received from the first player is not similar to the machine translation, determining, at the computing device, to modify parser data upon which the parser is trained based upon the translation received from the first player.

3. The method of claim 2, wherein the phrase is rendered in distorted text.

4. The method of claim 2, wherein the receiving a translation of the phrase from the first player comprises receiving a text input from the first player.

5. The method of claim 2, wherein the receiving a translation of the phrase from the first player comprises receiving a selection from the first player of one of a plurality of alternative translations.

6. The method of claim 2, wherein the rendering the phrase to the first player comprises:
   determining an area of language in which the machine translator is weak; and
   generating the phrase in the area of language in which the machine translator is weak.

7. The method of claim 6, wherein the area of language in which the machine translator is weak comprises a field with a specialized jargon.

8. The method of claim 6, wherein the area of language in which the machine translator is weak comprises an idiomatic aspect of a language.

9. The method of claim 6, wherein the area of language in which the machine translator is weak comprises an area in which the machine translator does not have sufficient known good translations.

10. The method of claim 2, wherein the rendering a phrase to a first player comprises:
    determining an attribute of the first player, the attribute of the first player being based on past, present or predicted behavior of the first player; and
    generating a phrase based upon the attribute of the first player.

11. The method of claim 10, wherein the attribute indicates an area of expertise of the first player.

12. The method of claim 2, wherein the comparing the translation of the phrase received from the first player with a translation of the phrase received from a second player comprises determining the edit distance between the translation received from the first player and the translation received from the second player.

13. The method of claim 2, wherein the determining that the translation received from the first player is similar to the translation received from the second player comprises determining if the similarity exceeds the value of a similarity threshold.

14. The method of claim 2, further comprising modifying, at the computing device, the parser data based upon the translation received from the first player.

15. The method of claim 14, wherein modifying the parser data comprises modifying statistical parameters associated with a parse tree.

16. The method of claim 14, wherein modifying the parser data comprises modifying an entry in a phrase table.

17. The method of claim 14, wherein modifying the parser data comprises:
- determining a translation quality score associated with the player;
- weighting the translation based upon the determined translation quality score associated with the player.

18. A non-transitory computer-readable storage medium storing a plurality of instructions that cause a processor to perform a method, comprising:
- rendering a phrase to a first player of a translation game, the first player being a human;
- receiving a translation of the phrase from the first player;
- comparing the translation of the phrase received from the first player to a translation of the phrase received from a second player of the translation game, the second player being a human;
- determining whether the translation received from the first player is similar to the translation received from the second player; and
- when the translation received from the first player is similar to the translation received from the second player:
  - comparing the translation received from the first player with a machine translation, the machine translation being generated by a machine translator that includes a parser,
  - determining whether the translation received from the first player is similar to the machine translation, and
  - when the translation received from the first player is not similar to the machine translation, determining to modify parser data upon which the parser is trained based upon the translation received from the first player.

19. The non-transitory computer-readable storage medium of claim 18, wherein the rendering the phrase to the first player comprises:
- determining an area of language in which the machine translator is weak; and
- generating the phrase in the area of language in which the machine translator is weak.

20. The non-transitory computer-readable storage medium of claim 18, wherein the rendering a phrase to a first player comprises:
- determining an attribute of the first player, the attribute of the first player being based on past, present or predicted behavior of the first player; and
- generating a phrase based upon the attribute of the first player.

* * * * *